April 15, 1958  F. W. JACKSON  2,831,132
MAGNETOSTRICTIVE RECIPROCATING MOTOR
Filed June 28, 1954
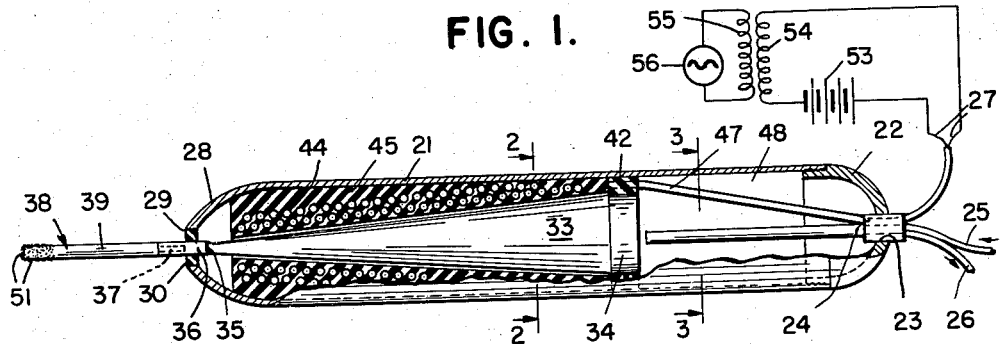
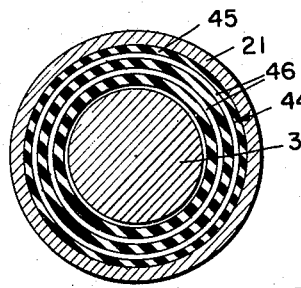
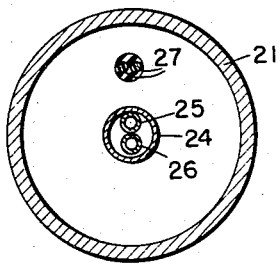
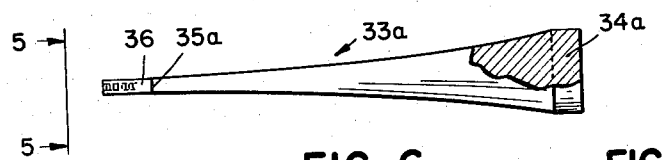
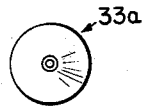
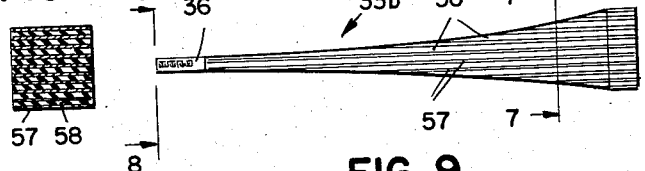
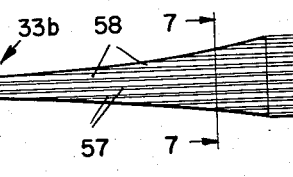
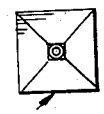
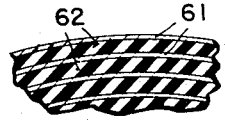
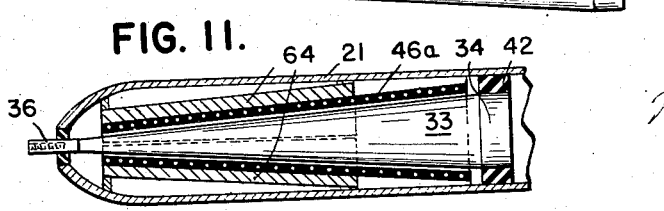
INVENTOR
FOREST W. JACKSON
BY
ATTORNEY

United States Patent Office 2,831,132
Patented Apr. 15, 1958

2,831,132

MAGNETOSTRICTIVE RECIPROCATING MOTOR

Forest W. Jackson, West Los Angeles, Calif.

Application June 28, 1954, Serial No. 439,645

6 Claims. (Cl. 310—26)

This invention relates to a magnetostrictive actuating means for a supersonic reciprocating tool.

One object of the invention is to provide a transducer or supersonic motor for reciprocating a tool at ultrasonic frequencies. Another object is to provide an ultrasonic reciprocating motor having relatively large oscillatory amplitude. Another object is to provide a magnetostrictive reciprocating motor, in which the magnetostrictive element is an exponentially tapered cone, which functions not only to generate reciprocating movement, but also to mechanically amplify the generated movement to the tool. A further object is to provide a reciprocating motor for applying supersonic vibrations in a compact hand tool which permits its use in the mouth for performing dental operations. These and other objects are attained by my invention which will be understood from the following description, references being made to the drawings accompanying, in which:

Figure 1 is a side elevational view, partly in section, of a preferred magnetostrictive reciprocating motor in accordance with my invention;

Figure 2 is a cross sectional view taken on the line 2—2 of Figure 1;

Figure 3 is a cross sectional view taken on the line 3—3 of Figure 1;

Figure 4 is a side elevational view, partly in section, of an alternative form of a magnetostrictive element for a motor similar to that shown in Figure 1;

Figure 5 is an end elevational view of the alternative form shown in Figure 4;

Figure 6 is a side elevational view of another alternative form of my invention;

Figure 7 is a cross sectional view taken on the line 7—7 of Figure 6;

Figure 8 is an end elevational view of the form shown in Figure 6;

Figure 9 is a side elevational view with parts broken away of another alternative form of the magnetostrictive element made up of laminated conical parts;

Figure 10 is a fragmentary sectional view taken on the line 10—10 of Figure 9;

Figure 11 is a magnetostrictive motor similar to that shown in Figure 1, in which a permanent magnet is used.

Referring to the drawing, my reciprocating motor invention consists of an outer tubular sheathing 21, preferably of non-corrosive, non-magnetic metal, which is provided at one end with a closing cap 22 which is threadedly engaged to the end of the sheathing, the cap being provided with an opening 23 for a flexible cable 24 which encloses water inlet tube 25, a water outlet tube 26 and insulated wires 27 for connection to the windings which will be later described. The end of the sheath 21 opposite the closing cap 22 is also closed by a tapered end portion 28 which has a small opening at its apex 29 which is provided with a flexible rubber seal 30 extending from the edges of the opening to the tool-holding stud 36, thus sealing the opening against moisture, etc., while not interfering with the reciprocation of the stud 36. A conically-shaped magnetostrictive element 33 is securely attached to the periphery of the large end portion 34 thereof and to the sheath by a ring 42 of resilient rubber-like material such as "silastic," said ring being fastened inside the sheath 21 near the closing cap end. The apex 35 of the conical element 33 is soldered or brazed or otherwise attached rigidly to a cylindrical tool-holding stud 36 which is provided at its free end with a threaded socket 37 for attachment to the shank 39 of a tool 38.

In this preferred form of my invention, the magnetostrictive element 33 is constructed in the form of a solid cone of magnetostrictive material such as nickel, nickel steel, or the like. Inside the sheath 21, and attached thereto, is a coil 44 consisting of suitable windings of insulated wire formed with insulating material, for example an epoxy resin 45, and shaped to conform to the space between the conical element 33 and the inside surface of the sheath 21, the windings being as close as possible to the surface of said cone. The terminals 47 of the coil 44 are carried through the ring 42 into a cooling chamber 48 which is defined by the space between the large end of the element 33, the ring 42, the closing cap 22 and a portion of the sheath 21 adjacent thereto. A water inlet tube 25 and a water outlet tube 26 are provided and these, together with the terminals 47 of the coil 44, are carried through an opening 23 in the closing cap 22 by a flexible cable 24.

The tool 38 may be of an abrasive material, for example diamond particles 51, embedded in the ends and sides of the free end of the shank 39 of the tool. However, it will be understood that other tools, either of metal or bonded abrasive materials, may be used in place of the diamond tool which is shown.

The coil 44 containing the wire windings 46 is so designed that it may be used both for the direct biasing current and for the actuating high frequency alternating current which is required to activate the magnetostrictive element 33. One illustrative method of connecting the windings is shown in the wiring diagram adjacent Figure 1, in which the direct current is shown as supplied by the battery 53, and the alternating current being inductively coupled through the coils 54 and 55, the alternating current being supplied by conventional oscillator and amplifier combinations indicated at 56. The frequency of oscillation is adjusted and maintained in the resonance frequency of the particular vibrating system preferably in the supersonic range of about 25,000 cycles per second, or more.

In Figures 4 and 5 there is shown an alternative magnetostrictive element 33a which is constructed in the form of a solid cone which is exponentially tapered, for example so that the cross sectional area of the cone doubles for each unit of length axially of the cone. The element 33a is provided with a short cylindrical end portion 34a at the large end of the cone and the apex of the cone 35a is attached to a tool-holding stud 36 in the same manner as described above.

In Figures 6 to 8, there is shown another alternative form of the magnetostrictive element 33b of my invention in which the exponentially tapered cone is made up of longitudinal laminations 57 of thin nickel or equivalent magnetostrictive foil made into a solid cone by means of insulating laminations 58 between the layers of foil.

In Figures 9 and 10 there is shown still another alternative structure of the magnetostrictive element 33c of my invention in which the conical shape is produced by forming successive electro-plated layers of nickel 61 on the outside of an originally shaped hollow cone 60, the layers of nickel being separated by layers of insulating material 62 applied to the successive layers of electro-deposited nickel 61. The final shape of the cone following this modification is determined by the shape of the original cone 60 which may have straight sides or be exponentially tapered as described above. In using the modification shown in Figures 9 and 10, the hollow portion of the original cone 60 may be used to augment the water cooling, or energizing coils may be placed inside the cone.

In Figure 11 there is shown a form of a reciprocating motor similar to that shown in Figure 1, in which permanent magnetized bars 64 are attached to the inside of the sheath 21 adjacent the windings of wire 46. The permanent magnetized bars 64 effect the biasing of the element 33 and the actuating high frequency alternating current alone is carried by the wires 46.

While I have described my invention in its preferred forms in terms of a magnetostrictive metal such as nickel, other magnetostrictive or piezoelectric materials may also be formed into tapered core elements for ultrasonic transducers by sintering or fusing ferrites, barium titanate, other piezoelectric ceramics, and similar materials, under suitable stressing conditions, without departing from the scope of my invention.

The principal advantage of my invention is that the amplitude normally generated in a magnetostrictive element of the length shown is stepped up because of the amplification by transmission down the exponentially tapered magnetostrictive element. By the use of this exponentially tapered cone, or any cone approaching the exponential taper, it is possible to generate and use higher frequencies than have heretofore been possible in transducers of the magnetostrictive metal type having uniform magnetostrictive cores.

The reciprocating motors having conical magnetostrictive elements, as herein described, may be used not only for actuating dental and surgical tools, but also for actuating other tools in other arts. The device may also be used in sonar signalling, loudspeakers, rearrangement of structure in solidifying molten metals, releasing oils from oil sands, riveting operations and in other applications of supersonic reciprocations.

I claim:

1. In a magnetostrictive transducer for producing longitudinal oscillations, a solid tapered core of magnetostrictive metal, and means for subjecting said tapered core to an alternating magnetic field.

2. In a magnetostrictive transducer for producing longitudinal oscillations, a solid tapered core consisting of magnetostrictive metal foil with interleaved insulation layers, and means for subjecting said tapered core to an alternating magnetic field.

3. In a magnetostrictive transducer for producing longitudinal oscillations, a solid conical core of thin sheets of magnetostrictive metal and layers of insulation, in nested interleaved relation, each sheet and layer being hollow conical in shape, and means for subjecting said tapered core to an alternating magnetic field.

4. In a magnetostrictive transducer for producing longitudinal oscillations, a solid magnetostrictive metal core of exponentially tapered shape, and means for subjecting said tapered core to an alternating magnetic field.

5. In a magnetostrictive transducer for producing longitudinal oscillations, a solid magnetostrictive laminated metal core of exponentially tapered shape, and means for subjecting said tapered core to an alternating magnetic field.

6. In a magnetostrictive transducer for producing longitudinal oscillations, a solid tapered core of magnetostrictive metal disposed within a magnetic field, a non-tapered mounting base at the larger end of said tapered core, and means for subjecting said tapered core portion to an alternating magnetic field.

References Cited in the file of this patent

UNITED STATES PATENTS

| | | |
|---|---|---|
| 2,489,768 | Firth | Nov. 29, 1949 |
| 2,530,224 | Camp | Nov. 14, 1950 |
| 2,549,578 | Curtis | Apr. 17, 1951 |
| 2,638,567 | Cronin | May 12, 1953 |
| 2,651,148 | Carwile | Sept. 8, 1953 |

FOREIGN PATENTS

| | | |
|---|---|---|
| 919,021 | France | Nov. 18, 1946 |